United States Patent
Chen et al.

(10) Patent No.: US 11,258,737 B2
(45) Date of Patent: Feb. 22, 2022

(54) INSTANT MESSAGING METHOD, APPARATUS AND SYSTEM BASED ON EMAIL SYSTEM

(71) Applicant: LUNKR TECHNOLOGY (GUANGZHOU) CO., LTD., Guangdong (CN)

(72) Inventors: Yingtang Chen, Guangdong (CN); Dajian Xuan, Guangdong (CN)

(73) Assignee: LUNKR TECHNOLOGY (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 16/961,250

(22) PCT Filed: Jan. 3, 2019

(86) PCT No.: PCT/CN2019/070251
§ 371 (c)(1),
(2) Date: Jul. 9, 2020

(87) PCT Pub. No.: WO2019/137292
PCT Pub. Date: Jul. 18, 2019

(65) Prior Publication Data
US 2021/0067475 A1 Mar. 4, 2021

(30) Foreign Application Priority Data

Jan. 9, 2018 (CN) .......................... 201810025582.7

(51) Int. Cl.
*H04L 12/58* (2006.01)
*H04L 51/046* (2022.01)
(Continued)

(52) U.S. Cl.
CPC .......... *H04L 51/046* (2013.01); *G06F 40/166* (2020.01); *G06K 9/00469* (2013.01); *H04L 51/08* (2013.01); *H04L 51/22* (2013.01)

(58) Field of Classification Search
CPC ....... H04L 51/046; H04L 51/08; H04L 51/22; G06F 40/166; G06K 9/00469
See application file for complete search history.

(56) References Cited

U.S. PATENT DOCUMENTS 6,988,138 B1 * 1/2006 Alcorn ..................... G09B 5/02
434/350
2008/0071868 A1 3/2008 Arenburg et al.
(Continued)

FOREIGN PATENT DOCUMENTS

| CN | 101188578 A | 5/2008 |
| CN | 107368238 A | 11/2017 |

OTHER PUBLICATIONS

International Search Report of PCT Patent Application No. PCT/CN2019/070251 dated Mar. 25, 2019.

*Primary Examiner* — Kristie D Shingles

(57) ABSTRACT

An instant messaging method, apparatus and system based on an email system. Establishing a discussion group in response to a discussion initiating request sent by a client according to an email page, and taking an email subject, email contacts, and an email body of the email page as a discussion subject, members, and a discussion information flow of the discussion group; receiving the discussion subject, the members, and the discussion information flow that are added, deleted or changed on an editing page and sent by the client, and updating same to the editing page of a local database; and generating, in response to a confirmation request sent by the client, a discussion page and a discussion group link associated with each other, and sending the discussion group link to clients of all the members of the (Continued)

discussion group, so that the client enters the discussion group through the link.

12 Claims, 6 Drawing Sheets

(51) Int. Cl.
   *G06F 40/166* (2020.01)
   *G06K 9/00* (2022.01)
   *H04L 51/08* (2022.01)
   *H04L 51/42* (2022.01)

(56) References Cited

U.S. PATENT DOCUMENTS

| | | | |
|---|---|---|---|
| 2016/0255139 A1* | 9/2016 | Rathod | H04L 51/046 709/203 |
| 2019/0253431 A1* | 8/2019 | Atanda | G06F 21/62 |

* cited by examiner

INSTANT MESSAGING METHOD, APPARATUS AND SYSTEM BASED ON EMAIL SYSTEM

TECHNICAL FIELD

The present invention relates to the field of instant messaging, and in particular, to an instant messaging method, apparatus and system based on an email system.

BACKGROUND

Enterprise instant messaging is classified into two types. One type focuses on working within an enterprise, to establish a communication platform for employees, reduce operating costs, and improve enterprise working efficiency. The other type is used for integrating related applications based on instant messaging. Up till now, enterprise communication software, such as XG Push, AnyChat IM, ActiveMessenger, QuickDove, Tencent RTX, Arrow IM, Dingdang Wangyetong, Microsoft Lync, SUNDNS Lync, BigAnt, Anychat, IBMLotus Sametime, imo-Instant Messaging Office, Tencent EC, China Mobile Enterprise Fetion, FastMsg, Yiao, and CECISEIM, has been widely used by various enterprises.

An email system is indispensable communication software in an enterprise informatization process. Generally, enterprises may use various solutions such as self-constructing, renting, and cloud deployment. No matter which solution is used, the basic function of the solution is to provide an email communication service for enterprise employees and external customers by using the email system.

However, in the prior art, advanced enterprise information communication functions such as instant messaging, remote demonstration, schedule sharing management, and Internet telephony have not been implemented based on the basic functions of the email system yet. Domestic email system products mainly focus on the email function. That is, the existing email systems generally cannot initiate instant messaging and switch a discussion group through an email page directly. This reduces the efficiency of email communication to a certain extent.

SUMMARY

A technical problem to be solved by embodiments of the present invention is to provide an instant messaging method, apparatus and system based on an email system. By connecting instant messaging to the email system, instant messaging can be directly initiated on an email page according to email content, that is, a new discussion can be created, thereby improving the efficiency of email communication.

To resolve the above problem, embodiments of the present invention provide an instant messaging method based on an email system, including the following steps:

establishing a discussion group in response to a discussion initiating request sent by a client according to an email page, and taking an email subject, email contacts, and an email body of the email page as a discussion subject, members, and a discussion information flow of the discussion group by default;

generating an editing page according to the discussion group, and sending the editing page to the client;

unlocking an editing tool of the editing page in response to an editing request sent by the client according to the editing page;

receiving the discussion subject, the members, and the discussion information flow that are added, deleted or changed by using the editing tool and sent by the client, and updating the discussion subject, the members, and the discussion information flow to the editing page of a local database in real time;

generating, in response to a confirmation request sent by the client according to the editing page, a discussion page and a discussion group link associated with each other, and sending the discussion group link to clients of all the members of the discussion group; and sending the discussion page to the client in response to an access request sent by the client according to the discussion group link.

Preferably, the email page, the editing page and the discussion page each include one or a combination of more than one of a link, a text, a picture, or an attachment.

Preferably, the email contacts and the members are all associated with an address book of the client; and the address book includes names, email addresses, contact numbers, and departments and positions.

Preferably, the instant messaging method based on an email system further includes:

receiving marked content sent by the client according to the discussion page of the discussion group, and saving the marked content in the local database;

generating a sharing page according to the marked content in response to an email sharing request sent by the client according to the discussion page, and sending the sharing page to the client;

taking the discussion subject as a new email subject by default and taking the members as new email recipients by default according to the email sharing request;

receiving shared content sent by the client according to the sharing page, and generating a new email body in a preset format according to the shared content;

generating a new email page according to the new email body, the new email subject and the new email recipients, and sending the new email page to the client;

unlocking an editing tool of the new email page in response to an editing request sent by the client according to the new email page;

receiving the new email subject, the new email recipients and the new email body that are added, deleted or changed by using the editing tool and sent by the client, and updating the new email subject, the new email recipients and the new email body to the new email page of the local database in real time; and packaging the new email page into a new email and sending the new email to email addresses corresponding to the new email recipients in response to a sending request sent by the client according to the new email page.

Preferably, the receiving shared content sent by the client according to the sharing page, and generating a new email body in a preset format according to the shared content specifically includes:

receiving shared content that is formed by one or more pieces of the marked content and sent by the client, the shared content including one or a combination of more than one of a link, a text, a picture, or an attachment;

extracting a message body from the shared content; and recognizing a subject, a predicate, and an object of the message body by using a syntax tree, and integrating the subject, the predicate and the object into the new email body according to the preset format.

Preferably, the marked content is record content selected and marked by the client according to the discussion information flow of the discussion page; the record content is saved in the local database; the record content includes a link, a text, a picture, and an attachment; and the discussion information flow and the marked content both include timestamps.

Embodiments of the present invention further provide an instant messaging apparatus based on an email system, including:

a discussion group establishing unit, configured to establish a discussion group in response to a discussion initiating request sent by a client according to an email page, and take an email subject, email contacts, and an email body of the email page as a discussion subject, members, and a discussion information flow of the discussion group by default;

an editing page generating unit, configured to generate an editing page according to the discussion group, and send the editing page to the client;

an editing unit, configured to unlock an editing tool of the editing page in response to an editing request sent by the client according to the editing page; receive the discussion subject, the members and the discussion information flow that are added, deleted or changed by using the editing tool and sent by the client, and update the discussion subject, the members and the discussion information flow to the editing page of a local database in real time;

a confirmation unit, configured to generate, in response to a confirmation request sent by the client according to the editing page, a discussion page and a discussion group link associated with each other, and send the discussion group link to clients of all the members of the discussion group; and an access request processing unit, configured to send the discussion page to the client in response to an access request sent by the client according to the discussion group link.

Preferably, the instant messaging apparatus based on an email system further includes:

a marked content processing unit, configured to receive marked content sent by the client according to the discussion page of the discussion group, and save the marked content in the local database;

an email sharing request processing unit, configured to generate a sharing page according to the marked content in response to an email sharing request sent by the client according to the discussion page, and send the sharing page to the client; and take the discussion subject as a new email subject by default and take the members as new email recipients by default according to the email sharing request;

an email body generating unit, configured to receive shared content sent by the client according to the sharing page, and generate a new email body in a preset format according to the shared content;

an email page generating unit, configured to generate a new email page according to the new email body, the new email subject and the new email recipients, and send the new email page to the client;

the editing unit being further configured to unlock an editing tool of the new email page in response to an editing request sent by the client according to the new email page; and receive the new email subject, the new email recipients and the new email body that are added, deleted or changed by using the editing tool and sent by the client, and update the new email subject, the new email recipients and the new email body to the new email page of the local database in real time; and an email sharing unit, configured to package the new email page into a new email and send the new email to email addresses corresponding to the new email recipients in response to a sending request sent by the client according to the new email page.

Embodiments of the present invention further provide an instant messaging apparatus based on an email system, including a processor, a memory, and a computer program that is stored in the memory and configured to be executed by the processor, where when executing the computer program, the processor implements the above instant messaging method based on an email system.

Embodiments of the present invention further provide an instant messaging system based on an email system, including a client and a server, where the client is configured to send a discussion initiating request to the server according to an email page;

the server is configured to create a discussion group according to the discussion initiating request, take an email subject, email contacts and an email body of the email page as a discussion subject, members and a discussion information flow of the discussion group by default, generate an editing page according to the discussion group, and send the editing page to the client;

the client is further configured to send an editing request to the server according to the editing page;

the server is further configured to unlock an editing tool of the editing page according to the editing request;

the client is further configured to send, to the server, the discussion subject, the members and the discussion information flow that are added, deleted or changed by using the editing tool;

the server is further configured to update the discussion subject, the members, and the discussion information flow to the editing page of a local database in real time;

the client is further configured to send a confirmation request to the server according to the editing page;

the server is further configured to generate, according to the confirmation request, a discussion page and a discussion group link associated with each other, and send the discussion group link to clients of all the members of the discussion group;

the client is further configured to send an access request to the server according to the discussion group link; and the server is further configured to send the discussion page to the client according to the access request.

The embodiments of the present invention have the following beneficial effects:

The embodiments of the present invention provide an instant messaging method, apparatus and system based on an email system. The method includes: establishing a discussion group in response to a discussion initiating request sent by a client according to an email page, and taking an email subject, email contacts, and an email body of the email page as a discussion subject, members, and a discussion information flow of the discussion group by default; receiving the discussion subject, the members, and the discussion information flow that are added, deleted or changed on an editing page and sent by the client, and updating the discussion subject, the members, and the discussion information flow to the editing page of a local database in real time; and generating, in response to a confirmation request sent by the client, a discussion page and a discussion group link associated with each other, and sending the discussion group link to clients of all the members of the discussion group, so that the client enters the discussion group through the link. In the present invention, by connecting instant messaging to the email system, instant messaging can be directly initiated on an email page according to email content, that is, a new discussion can be created, thereby improving the efficiency of email communication.

DESCRIPTION OF EMBODIMENTS

The following clearly and completely describes the technical solutions in the embodiments of the present invention with reference to accompanying drawings in the embodiments of the present invention. Apparently, the described examples are merely a part rather than all of the embodiments of the present invention. All other embodiments obtained by a person of ordinary skill in the art based on the embodiments of the present invention without creative efforts shall fall within the protection scope of the present invention.

It should be noted that the client in the embodiments of the present invention may be a mobile terminal or a non-mobile terminal. The non-mobile terminal includes a desktop computer. The mobile terminal includes mobile Internet devices capable of wireless communication, for example, a smart phone (such as an Android phone or an iOS phone), smart glasses, a smart watch, a smart band, a tablet computer, a notebook computer, and a personal digital assistant.

First Embodiment of the Present Invention

Figure 1:
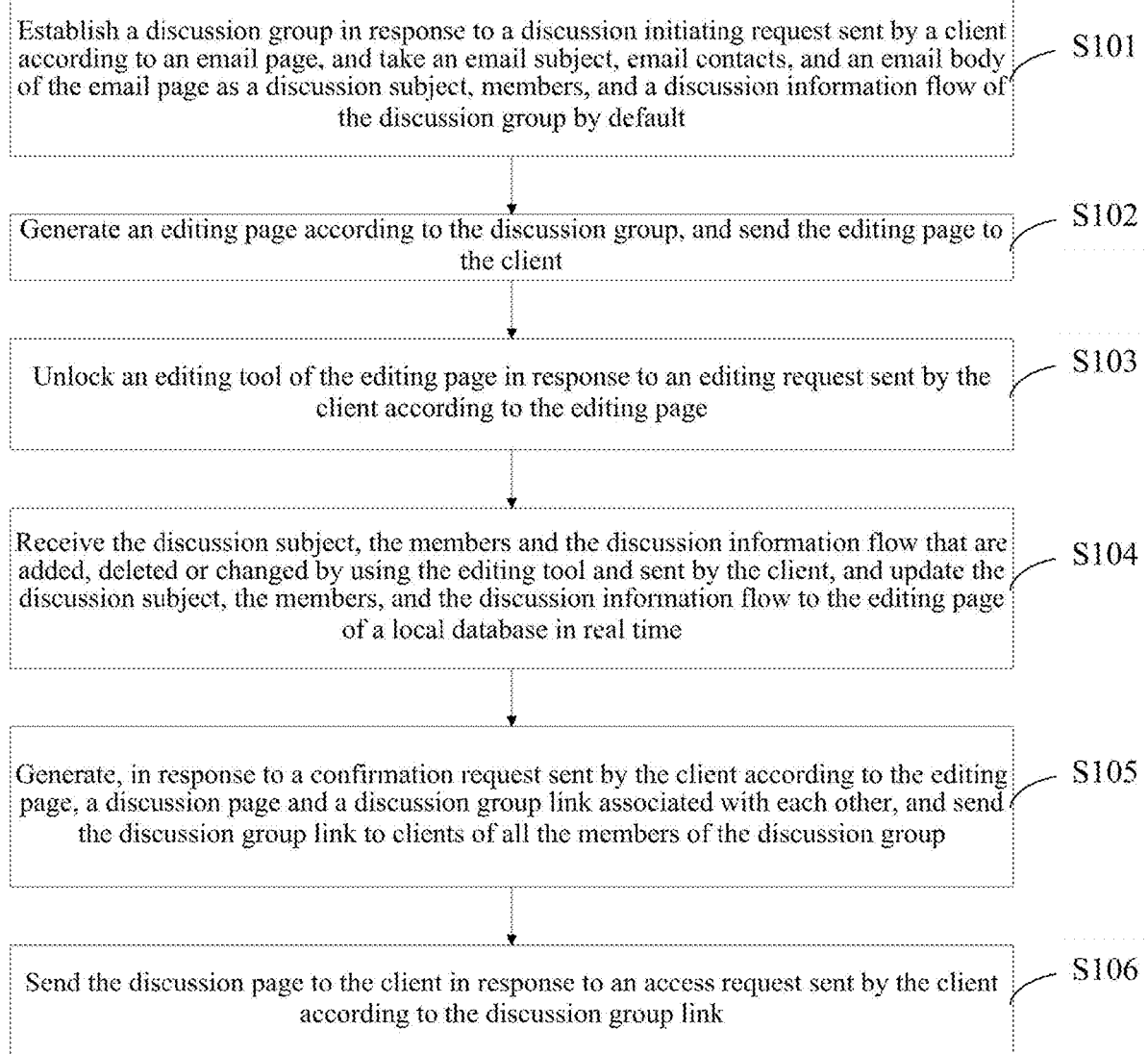
FIG. 1 is a schematic flowchart of an instant messaging method based on an email system according to a first embodiment of the present invention.

Referring to FIG. 1. FIG. 1 is a schematic flowchart of an instant messaging method based on an email system according to a first embodiment of the present invention. The instant messaging method based on an email system includes the following steps:

S101: establish a discussion group in response to a discussion initiating request sent by a client according to an email page, and take an email subject, email contacts, and an email body of the email page as a discussion subject, members, and a discussion information flow of the discussion group by default.

It may be appreciated that the email page, an editing page or a discussion page each includes one or a combination of more than one of a link, a text, a picture, or an attachment. The email contacts and the members are all related to an address book of the client. The address book includes names, email addresses, contact numbers, and departments and positions.

In this embodiment, a discussion can be created on the email page directly, without exiting the email page and switching to a discussion creating page. It is unnecessary to additionally add the discussion subject and members manually, which simplifies the scene transition, simplifies the discussion creating operation, and improves the user experience.

S102: generate an editing page according to the discussion group, and send the editing page to the client.

S103: unlock an editing tool of the editing page in response to an editing request sent by the client according to the editing page.

S104: receive the discussion subject, the members and the discussion information flow that are added, deleted or changed by using the editing tool and sent by the client, and update the discussion subject, the members, and the discussion information flow to the editing page of a local database in real time.

In this embodiment, a user may edit the editing page through the client. That is, after the editing tool of the editing page is unlocked according to the editing request sent by the editing page to a server, the user may add, delete or change the discussion subject, members, and discussion information flow of the editing page according to an actual situation. The server may update the discussion subject, the members, and the discussion information flow to the editing page of the local database in real time.

S105: generate, in response to a confirmation request sent by the client according to the editing page, a discussion page and a discussion group link associated with each other, and send the discussion group link to clients of all the members of the discussion group.

S106: send the discussion page to the client in response to an access request sent by the client according to the discussion group link.

Figure 2:
FIG. 2 is a schematic diagram of a discussion creating page in the first embodiment of the present invention.
Figure 3:
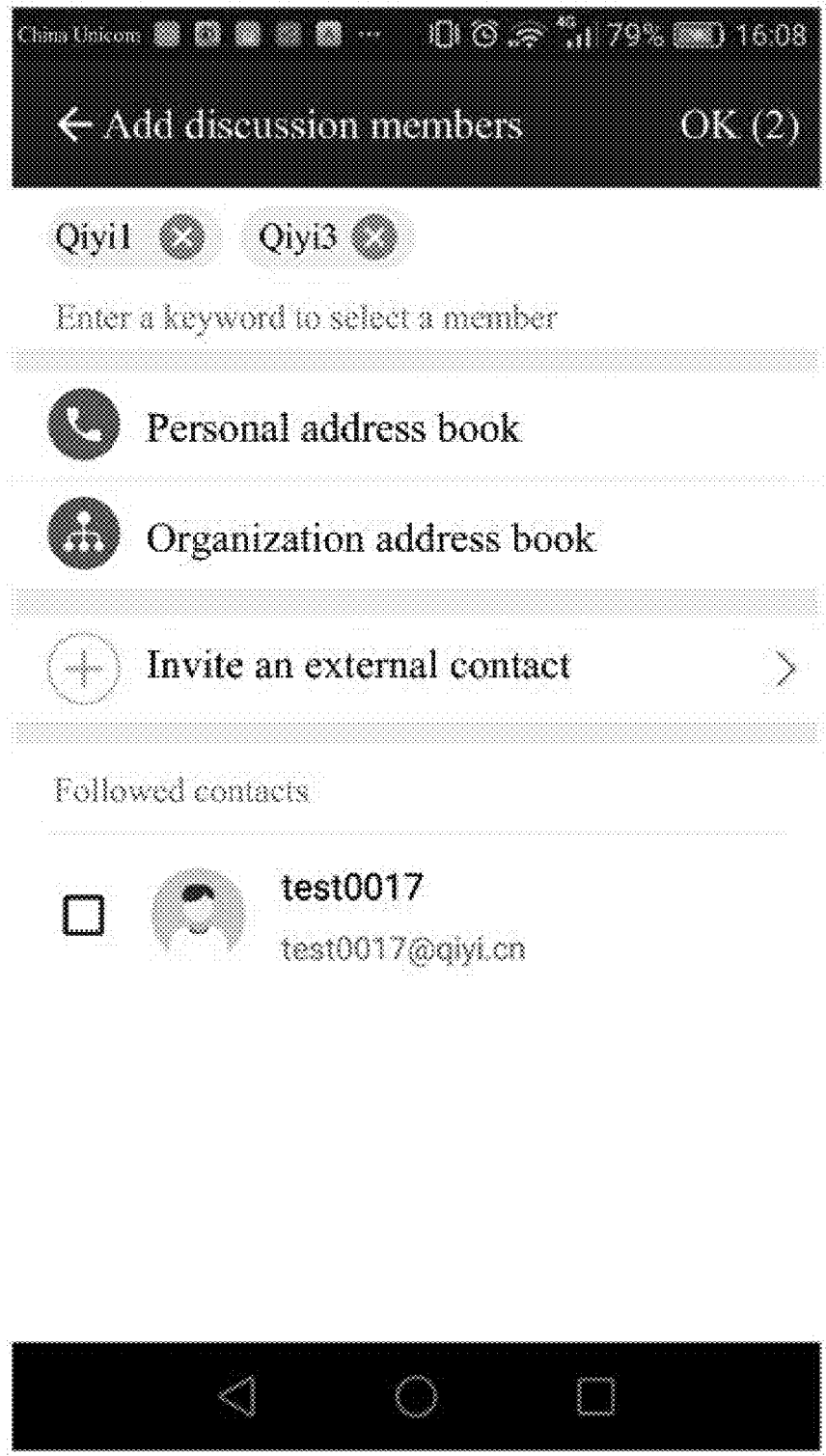
FIG. 3 is a schematic diagram of an editing page in the first embodiment of the present invention.
Figure 4:
FIG. 4 is a schematic diagram of a creation success page in the first embodiment of the present invention.

Referring to FIG. 2, FIG. 3 and FIG. 4. FIG. 2, FIG. 3 and FIG. 4 are a schematic diagram of a discussion creating page, a schematic diagram of an editing page, and a schematic diagram of a creation success page in the first embodiment of the present invention respectively.

In this embodiment, in a process of creating a new discussion group, contacts related to the original email are automatically filled as new discussion members. A list of the contacts related to the original email is pulled as a member list, and the contacts, excluding the creator, are checked as new discussion members. In addition, the discussion members may further be added, deleted or changed flexibly, to meet discussion creating data, including pulling the email subject as the discussion subject. Further, an email is sent to the discussion group after the new discussion is created successfully according to the current email page, so that the discussion members are familiar with the topic of the discussion. The discussion members are provided with guidance, and the function improves the scene and provides better experience.

On the basis of the instant messaging method based on an email system in the first embodiment of the present invention, this embodiment further provides a corresponding email sharing method.

Figure 5:
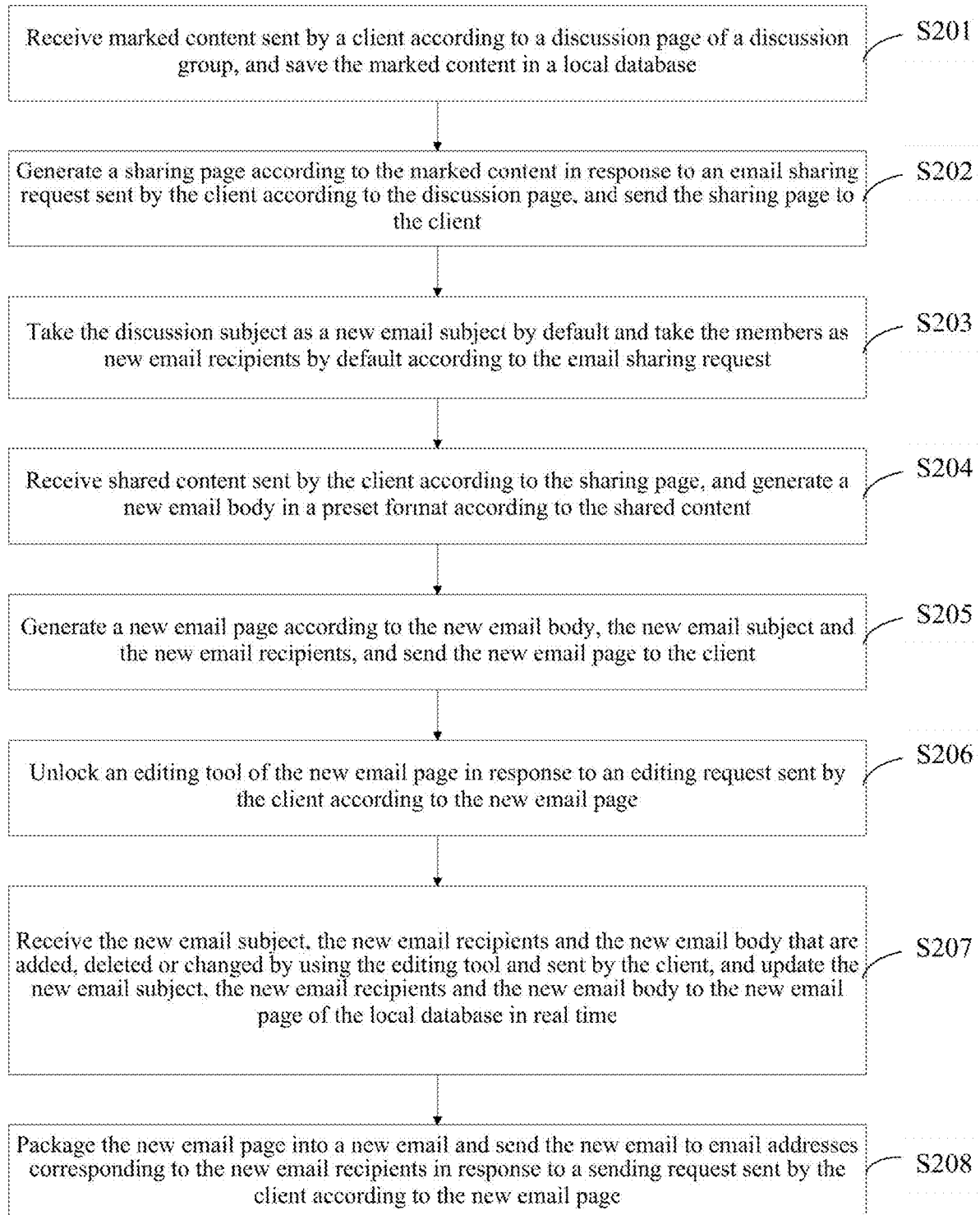
FIG. 5 is a schematic flowchart of an email sharing method in the first embodiment of the present invention.

Referring to FIG. 5. FIG. 5 is a schematic flowchart of an email sharing method in the first embodiment of the present invention.

The instant messaging method based on an email system further includes the following steps:

S201: receive marked content sent by the client according to the discussion page of the discussion group, and save the marked content in the local database.

In this embodiment, the marked content is record content selected and marked by the client according to a discussion information flow of the discussion page. The record content is saved in the local database. The record content includes a link, a text, a picture, and an attachment. The discussion information flow and the marked content both include timestamps. It may be appreciated that, when multiple users discuss with each other by using clients, a discussion information flow is generated. For example, in a group chat process of the discussion group, the user may select content such as important information, solution, and work implementation in the discussion information flow as a summary and mark the content as marked content. The server sorts out and saves the marked content according to the timestamps, types, subjects or categories of the received marked content, to facilitate subsequent information sharing.

It should be noted that, in the process of selecting content such as important information, solution, and work implementation in the discussion information flow as a summary and marking the content as marked content, the user may perform editing operations such as adding, deletion, and change on the marked content according to an actual situation.

S202: generate a sharing page according to the marked content in response to an email sharing request sent by the client according to the discussion page, and send the sharing page to the client.

In this embodiment, the sharing page refers to a list page including the marked content that has been selected and marked by the user in the discussion information flow, and is used for allowing the user to select marked content to be shared. It may be appreciated that the server invokes an email interface to establish a connection to the discussion group of the client according to the email sharing request sent by the client.

S203: take the discussion subject as a new email subject by default and take the members as new email recipients by default according to the email sharing request.

In this embodiment, when the user sends the email sharing request through the client, the server searches for the discussion subject and members of the discussion group in response to the email sharing request, and automatically fills in the discussion subject and the members as the email subject and the email recipients.

S204: receive shared content sent by the client according to the sharing page, and generate a new email body in a preset format according to the shared content.

In this embodiment, after the user checks one or more pieces of the marked content on the sharing page through the client to form the shared content and sends the shared content to the server, the server extracts a message body from the shared content, recognizes a subject, a predicate and an object of the message body by using a syntax tree, and integrates the subject, the predicate, and the object into the email body according to the preset format.

S205: generate a new email page according to the new email body, the new email subject and the new email recipients, and send the new email page to the client.

In this embodiment, the user may edit the email page through the client. That is, after an editing tool of the email page is unlocked according to an editing request sent by the email page to the server, the user may add, delete or change the email subject, the email recipients and the email body of the email page according to an actual situation. The server may update the email subject, the email recipients, and the email body to the email page of the local database in real time.

It should be noted that the discussion group members and the email recipients are all related to the address book of the client or related to an imported enterprise address book. The address book includes names, email addresses, contact numbers, and departments and positions.

S206: unlock an editing tool of the new email page in response to an editing request sent by the client according to the new email page.

S207: receive the new email subject, the new email recipients and the new email body that are added, deleted or changed by using the editing tool and sent by the client, and update the new email subject, the new email recipients and the new email body to the new email page of the local database in real time.

S208: package the new email page into a new email and send the new email to email addresses corresponding to the new email recipients in response to a sending request sent by the client according to the new email page.

It may be appreciated that the email recipients are automatically filled in according to the members of the discussion group, or may be added, deleted or changed by the user subsequently.

It should be noted that, before one-click email sharing of the marked content is implemented, the method should further include a process of establishing the discussion group, to implement instant messaging.

An instant messaging method based on an email system provided in this embodiment of the present invention includes: establishing a discussion group in response to a discussion initiating request sent by a client according to an email page, and taking an email subject, email contacts, and an email body of the email page as a discussion subject, members, and a discussion information flow of the discussion group by default; receiving the discussion subject, the members, and the discussion information flow that are added, deleted or changed on an editing page and sent by the client, and updating the discussion subject, the members, and the discussion information flow to the editing page of a local database in real time; and generating, in response to a confirmation request sent by the client, a discussion page and a discussion group link associated with each other, and sending the discussion group link to clients of all the members of the discussion group, so that the client enters the discussion group through the link. In the present invention, by connecting instant messaging to the email system, instant messaging can be directly initiated on an email page according to email content, that is, a new discussion can be created, thereby improving the efficiency of email communication.

Second Embodiment of the Present Invention

Figure 6:
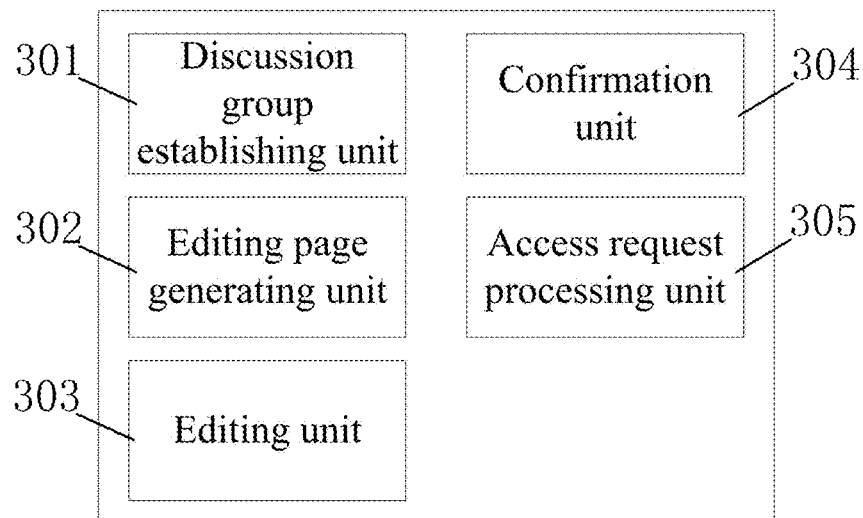
FIG. 6 is a schematic structural diagram of an instant messaging apparatus based on an email system according to a second embodiment of the present invention.

Referring to FIG. 6, FIG. 6 is a schematic structural diagram of an instant messaging apparatus based on an email system according to a second embodiment of the present invention.

The instant messaging apparatus based on an email system includes a discussion group establishing unit 301, an editing page generating unit 302, an editing unit 303, a confirmation unit 304, and an access request processing unit 305.

The discussion group establishing unit 301 is configured to establish a discussion group in response to a discussion initiating request sent by a client according to an email page, and take an email subject, email contacts, and an email body of the email page as a discussion subject, members, and a discussion information flow of the discussion group by default.

It may be appreciated that the email page, an editing page or a discussion page each includes one or a combination of more than one of a link, a text, a picture, or an attachment. The email contacts and the members are all related to an address book of the client. The address book includes names, email addresses, contact numbers, and departments and positions.

In this embodiment, a discussion can be created on the email page directly, without exiting the email page and switching to a discussion creating page. It is unnecessary to additionally add the discussion subject and members manually, which simplifies the scene transition, simplifies the discussion creating operation, and improves the user experience.

The editing page generating unit 302 is configured to generate an editing page according to the discussion group, and send the editing page to the client.

The editing unit 303 is configured to unlock an editing tool of the editing page in response to an editing request sent by the client according to the editing page; receive the discussion subject, the members and the discussion information flow that are added, deleted or changed by using the editing tool and sent by the client, and update the discussion subject, the members and the discussion information flow to the editing page of a local database in real time.

In this embodiment, a user may edit the editing page through the client. That is, after the editing tool of the editing page is unlocked according to the editing request sent by the editing page to a server, the user may add, delete or change the discussion subject, members, and discussion information flow of the editing page according to an actual situation. The server may update the discussion subject, members, and discussion information flow to the editing page of the local database in real time.

The confirmation unit 304 is configured to generate, in response to a confirmation request sent by the client according to the editing page, a discussion page and a discussion group link associated with each other, and send the discussion group link to clients of all the members of the discussion group.

The access request processing unit 305 is configured to send the discussion page to the client in response to an access request sent by the client according to the discussion group link.

In this embodiment, in a process of creating a new discussion group, contacts related to the original email are automatic automatically filled as new discussion members. A list of the contacts related to the original email is pulled as a member list, and the contacts, excluding the creator, are checked as the new discussion members. In addition, the discussion members may further be added, deleted or changed flexibly, to meet discussion creating data, including pulling the email subject as the discussion subject. Further, an email is sent to the discussion group after the new discussion is created successfully according to the current email page, so that the discussion members are familiar with the topic of the discussion. The discussion members are provided with guidance, and the function improves the scene and provides better experience.

Figure 7:
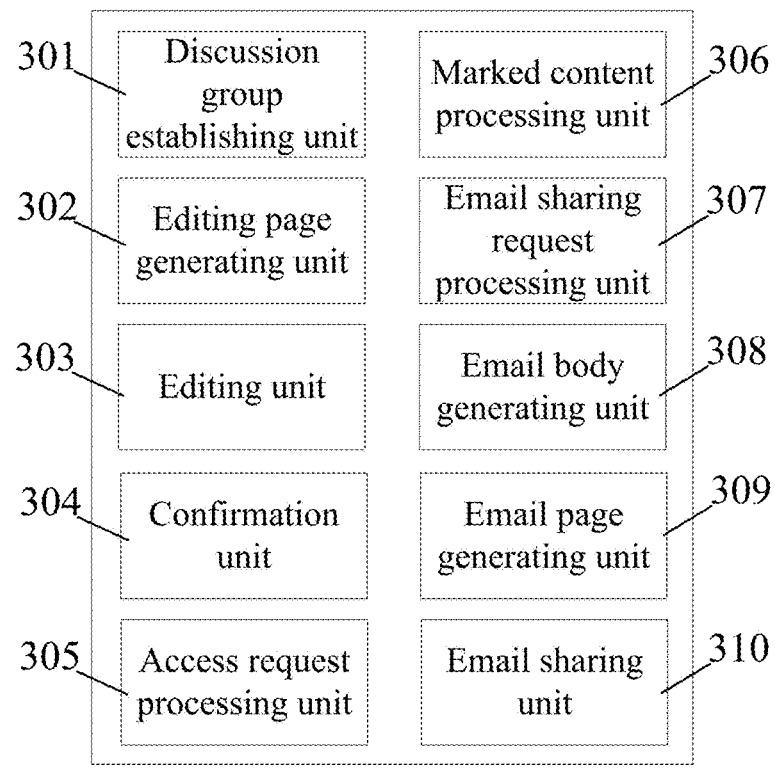
FIG. 7 is a schematic structural diagram of another email sharing apparatus based on instant messaging according to the second embodiment of the present invention.

Referring to FIG. 7. FIG. 7 is a schematic structural diagram of another email sharing apparatus based on instant messaging according to the second embodiment of the present invention.

The instant messaging apparatus based on an email system further includes a marked content processing unit 306, an email sharing request processing unit 307, an email body generating unit 308, an email page generating unit 309, and an email sharing unit 310.

The marked content processing unit 306 is configured to receive marked content sent by the client according to the discussion page of the discussion group, and save the marked content in the local database.

The email sharing request processing unit 307 is configured to generate a sharing page according to the marked content in response to an email sharing request sent by the client according to the discussion page, and send the sharing page to the client; and take the discussion subject as a new email subject by default and take the members as new email recipients by default according to the email sharing request.

The email body generating unit 308 is configured to receive shared content sent by the client according to the sharing page, and generate a new email body in a preset format according to the shared content.

The email page generating unit 309 is configured to generate a new email page according to the new email body, the new email subject and the new email recipients, and send the new email page to the client.

The editing unit 303 is further configured to unlock an editing tool of the new email page in response to an editing request sent by the client according to the new email page; and receive the new email subject, the new email recipients and the new email body that are added, deleted or changed by using the editing tool and sent by the client, and update the new email subject, the new email recipients and the new email body to the new email page of the local database in real time.

The email sharing unit 310 is configured to package the new email page into a new email and send the new email to email addresses corresponding to the new email recipients in response to a sending request sent by the client according to the new email page.

An instant messaging apparatus based on an email system provided in this embodiment of the present invention establishes a discussion group in response to a discussion initiating request sent by a client according to an email page, and takes an email subject, email contacts, and an email body of the email page as a discussion subject, members, and a discussion information flow of the discussion group by default; receives the discussion subject, the members, and the discussion information flow that are added, deleted or changed on an editing page and sent by the client, and updates the discussion subject, the members, and the discussion information flow to the editing page of a local database in real time; and generates, in response to a confirmation request sent by the client, a discussion page and a discussion group link associated with each other, and sends the discussion group link to clients of all the members of the discussion group, so that the client enters the discussion group through the link. In the present invention, by connecting instant messaging to the email system, instant messaging can be directly initiated on an email page according to email content, that is, a new discussion can be created, thereby improving the efficiency of email communication.

This embodiment of the present invention further provides an instant messaging apparatus based on an email system, including a processor, a memory, and a computer program that is stored in the memory and configured to be executed by the processor. When executing the computer program, the processor implements the foregoing instant messaging method based on an email system.

Third Embodiment of the Present Invention

This embodiment of the present invention further provides an instant messaging system based on an email system, including a client and a server.

The client is configured to send a discussion initiating request to the server according to an email page.

The server is configured to create a discussion group according to the discussion initiating request, take an email subject, email contacts and an email body of the email page as a discussion subject, members and a discussion information flow of the discussion group by default, generate an editing page according to the discussion group, and send the editing page to the client.

The client is further configured to send an editing request to the server according to the editing page.

The server is further configured to unlock an editing tool of the editing page according to the editing request.

The client is further configured to send, to the server, the discussion subject, the members and the discussion information flow that are added, deleted or changed by using the editing tool.

The server is further configured to update the discussion subject, the members, and the discussion information flow to the editing page of a local database in real time.

The client is further configured to send a confirmation request to the server according to the editing page.

The server is further configured to generate, according to the confirmation request, a discussion page and a discussion group link associated with each other, and send the discussion group link to clients of all the members of the discussion group.

The client is further configured to send an access request to the server according to the discussion group link.

The server is further configured to send the discussion page to the client according to the access request.

An instant messaging system based on an email system provided in this embodiment of the present invention establishes a discussion group in response to a discussion initiating request sent by a client according to an email page, and takes an email subject, email contacts, and an email body of the email page as a discussion subject, members, and a discussion information flow of the discussion group by default; receives the discussion subject, the members, and the discussion information flow that are added, deleted or changed on an editing page and sent by the client, and updates the discussion subject, the members, and the discussion information flow to the editing page of a local database in real time; and generates, in response to a confirmation request sent by the client, a discussion page and a discussion group link associated with each other, and sends the discussion group link to clients of all the members of the discussion group, so that the client enters the discussion group through the link. In the present invention, by connecting instant messaging to the email system, instant messaging can be directly initiated on an email page according to email content, that is, a new discussion can be created, thereby improving the efficiency of email communication.

The descriptions above are preferred embodiments of the present invention, and it should be noted that for those of ordinary skill in the art, various improvements and modifications can be made without departing from the principles of the present invention. These improvements and modifications should also be regarded as falling in the protection scope of the present invention.

Those of ordinary skill in the art can understand that all or some of processes for implementing the methods of the foregoing embodiments can be completed by instructing relevant hardware through a computer program. The program may be stored in a computer readable storage medium. When the program is executed, processes of the embodiments of the foregoing methods may be included. The storage medium may be a magnetic disk, an optical disc, a read-only memory (ROM), a random access memory (RAM), or the like.

The invention claimed is:

1. An instant messaging method based on an email system, comprising following steps:
    establishing a discussion group in response to a discussion initiating request sent by a client according to an email page, wherein an email subject, email contacts, and an email body of the email page are respectively used as a discussion subject, members, and a discussion information flow of the discussion group by default;
    generating an editing page according to the discussion group, and sending the editing page to the client;
    unlocking an editing tool of the editing page in response to an editing request sent by the client according to the editing page;
    receiving the discussion subject, the members, and the discussion information flow that are added, deleted or changed by using the editing tool and sent by the client, and updating the discussion subject, the members, and the discussion information flow to the editing page of a local database in real time;
    generating, in response to a confirmation request sent by the client according to the editing page, a discussion page and a discussion group link associated with each other, and sending the discussion group link to clients of all the members of the discussion group;
    sending the discussion page to the client in response to an access request sent by the client according to the discussion group link;
    receiving marked content sent by the client according to the discussion page of the discussion group, and saving the marked content in the local database;
    generating a sharing page according to the marked content in response to an email sharing request sent by the client according to the discussion page, and sending the sharing page to the client;
    taking the discussion subject as a subject of a new email by default and taking the members as recipients of the new email by default according to the email sharing request;
    receiving shared content sent by the client according to the sharing page, and generating a body of the new email in a preset format according to the shared content;
    generating a page of the new email according to the body of the new email, the subject of the new email and the recipients of the new email, and sending the page of the new email to the client;
    unlocking an editing tool of the page of the new email in response to an editing request sent by the client according to the page of the new email;
    receiving the subject of the new email, the recipients of the new email and the body of the new email that are added, deleted or changed by using the editing tool and sent by the client, and updating the subject of the new email, the recipients of the new email and the body of the new email to the page of the new email of the local database in real time; and
    packaging the page of the new email to form the new email and sending the new email to email addresses corresponding to the recipients of the new email in response to a sending request sent by the client according to the page of the new email.

2. The instant messaging method based on an email system according to claim 1, wherein the email page, the editing page and the discussion page each comprise one or a combination of more than one of a link, a text, a picture, or an attachment.

3. An instant messaging apparatus based on an email system, comprising a processor, a memory, and a computer program that is stored in the memory and configured to be executed by the processor, wherein when executing the computer program, the processor implements the instant messaging method based on an email system according to claim 2.

4. The instant messaging method based on an email system according to claim 1, wherein the email contacts and the members are all associated with an address book of the client; and the address book comprises names, email addresses, contact numbers, and departments and positions.

5. An instant messaging apparatus based on an email system, comprising a processor, a memory, and a computer program that is stored in the memory and configured to be executed by the processor, wherein when executing the computer program, the processor implements the instant messaging method based on an email system according to claim 4.

6. The instant messaging method based on an email system according to claim 1, wherein the receiving shared content sent by the client according to the sharing page, and generating a body of the new email in a preset format according to the shared content specifically comprises:

receiving shared content that is formed by one or more pieces of the marked content and sent by the client, the shared content comprising one or a combination of more than one of a link, a text, a picture, or an attachment;

extracting a message body from the shared content; and recognizing a subject, a predicate, and an object of the message body by using a syntax tree, and integrating the subject, the predicate and the object into the new email body according to the preset format.

7. An instant messaging apparatus based on an email system, comprising a processor, a memory, and a computer program that is stored in the memory and configured to be executed by the processor, wherein when executing the computer program, the processor implements the instant messaging method based on an email system according to claim 6.

8. The instant messaging method based on an email system according to claim 1, wherein the marked content is record content selected and marked by the client according to the discussion information flow of the discussion page; the record content is saved in the local database; the record content comprises a link, a text, a picture, and an attachment; and the discussion information flow and the marked content both comprise timestamps.

9. An instant messaging apparatus based on an email system, comprising a processor, a memory, and a computer program that is stored in the memory and configured to be executed by the processor, wherein when executing the computer program, the processor implements the instant messaging method based on an email system according to claim 8.

10. An instant messaging apparatus based on an email system, comprising a processor, a memory, and a computer program that is stored in the memory and configured to be executed by the processor, wherein when executing the computer program, the processor implements the instant messaging method based on an email system according to claim 1.

11. An instant messaging apparatus based on an email system, comprising:

a discussion group establishing unit, configured to establish a discussion group in response to a discussion initiating request sent by a client according to an email page, wherein an email subject, email contacts, and an email body of the email page are respectively used as a discussion subject, members, and a discussion information flow of the discussion group by default;

an editing page generating unit, configured to generate an editing page according to the discussion group, and send the editing page to the client;

an editing unit, configured to unlock an editing tool of the editing page in response to an editing request sent by the client according to the editing page; receive the discussion subject, the members and the discussion information flow that are added, deleted or changed by using the editing tool and sent by the client, and update the discussion subject, the members and the discussion information flow to the editing page of a local database in real time;

a confirmation unit, configured to generate, in response to a confirmation request sent by the client according to the editing page, a discussion page and a discussion group link associated with each other, and send the discussion group link to clients of all the members of the discussion group;

an access request processing unit, configured to send the discussion page to the client in response to an access request sent by the client according to the discussion group link;

a marked content processing unit, configured to receive marked content sent by the client according to the discussion page of the discussion group, and save the marked content in the local database;

an email sharing request processing unit, configured to generate a sharing page according to the marked content in response to an email sharing request sent by the client according to the discussion page, and send the sharing page to the client; and take the discussion subject as a subject of a new email by default and take the members as recipients of the new email by default according to the email sharing request;

an email body generating unit, configured to receive shared content sent by the client according to the sharing page, and generate a body of the new email in a preset format according to the shared content;

an email page generating unit, configured to generate a page of the new email according to the body of the new email, the subject of the new email and the recipients of the new email, and send the page of the new email to the client;

the editing unit being further configured to unlock an editing tool of the page of the new email in response to an editing request sent by the client according to the page of the new email; and receive the subject of the new email, the recipients of the new email and the body of the new email that are added, deleted or changed by using the editing tool and sent by the client, and update the subject of the new email, the recipients of the new email and the body of the new email to the page of the new email of the local database in real time; and an email sharing unit, configured to package the page of the new email to form the new email and send the new email to email addresses corresponding to the recipients of the new email in response to a sending request sent by the client according to the page of the new email.

12. An instant messaging system based on an email system, comprising a client and a server, wherein the client is configured to send a discussion initiating request to the server according to an email page;

the server is configured to create a discussion group according to the discussion initiating request, take an email subject, email contacts and an email body of the email page as a discussion subject, members and a discussion information flow of the discussion group by default, generate an editing page according to the discussion group, and send the editing page to the client;

the client is further configured to send an editing request to the server according to the editing page;

the server is further configured to unlock an editing tool of the editing page according to the editing request;

the client is further configured to send, to the server, the discussion subject, the members and the discussion information flow that are added, deleted or changed by using the editing tool;

the server is further configured to update the discussion subject, the members, and the discussion information flow to the editing page of a local database in real time;

the client is further configured to send a confirmation request to the server according to the editing page;

the server is further configured to generate, according to the confirmation request, a discussion page and a discussion group link associated with each other, and send the discussion group link to clients of all the members of the discussion group;

the client is further configured to send an access request to the server according to the discussion group link;

the server is further configured to send the discussion page to the client according to the access request;

the client is further configured to send marked content to the server according to the discussion page of the discussion group;

the server is further configured to receive the marked content and save the marked content in the local database;

the client is further configured to send an email sharing request to the server according to the discussion page;

the server is further configured to generate a sharing page according to the marked content in response to the email sharing request, and send the sharing page to the client;

the client is further configured to take the discussion subject as a subject of a new email by default and take the members as recipients of the new email by default according to the email sharing request;

the client is further configured to send shared content to the server according to the sharing page;

the server is further configured to receive shared content, and generate a body of the new email in a preset format according to the shared content;

the server is further configured to generate a page of the new email according to the body of the new email, the subject of the new email and the recipients of the new email, and send the page of the new email to the client;

the client is further configured to send an editing request to the server according to the page of the new email;

the server is further configured to unlock an editing tool of the page of the new email in response to the editing request;

the client is further configured to send the subject of the new email, the recipients of the new email and the body of the new email that are added, deleted or changed by the editing tool to the server;

the server is further configured to receive the subject of the new email, the recipients of the new email and the body of the new email that are added, deleted or changed by the editing tool, and update the subject of the new email, the recipients of the new email and the body of the new email to the page of the new email of the local database in real time;

the client is further configured to send a sending request to the server according to the page of the new email; and the server is further configured to package the page of the new email to form the new email and sending the new email to email addresses corresponding to the recipients of the new email in response to the sending request.

* * * * *